3,833,578
PYRAZINOYLALKYLBENZENESULFONYLUREAS AND PROCESS FOR THEIR PREPARATION

Vittorio Ambrogi, Bresso, and Willy Logemann, Marcantonio Parenti, and Raffaele Tommasini, Milan, Italy, assignors to Carlo Erba S.p.A., Milan, Italy
No Drawing. Continuation-in-part of abandoned application Ser. No. 80,141, Oct. 12, 1970. This application June 11, 1971, Ser. No. 152,447
Claims priority, application Italy, Oct. 17, 1969, 23,489/69
Int. Cl. C07d 51/76
U.S. Cl. 260—250 R   26 Claims

ABSTRACT OF THE DISCLOSURE

New pyrazinoylalkylbenzenesulfonylureas and a process for their preparation are disclosed, for example N-(1-azacyclohept-1-yl)-N'-{4-[β-(5-methyl-pyrazine-2-carboxamido)ethyl]benzenesulfonyl}urea, and N-(4-methyl-piperidino)-N'-{4-[β-(5-methyl-pyrazine-2-carboxamido)ethyl]benzenesulfonyl}urea. These compounds are useful for their hypoglycemic activity.

---

This application is a continuation-in-part of our co-pending application Ser. No. 80,141, filed Oct. 12, 1970 now abandoned.

This invention relates to novel acylaminoalkylbenzenesulfonyl ureas and a process for their preparation.

The compounds of the present invention have been found to exhibit hypoglycemic activity when administered orally in responsive cases of diabetes mellitus either alone or in combination with biguanide congeners, such as 1-phenethylbiguanide or N'-β-phenethylformamidinyliminourea (Phenformin) and its hydrochlorides. Heretofore oral diabetes mellitus therapy has been accomplished using oral hypoglycemic agents such as sulfonylureas (1-butyl-3-p-polylsulfonylurea and 1-propyl-3-p-chlorobenzenesulfonylurea) and the biguanides above. Administration, mechanism of action and therapeutic uses of these known compounds are described in Goodman & Gilman, The Pharmacological Basic of Therapeutics (1965).

The compounds of the present invention have the following general formula:

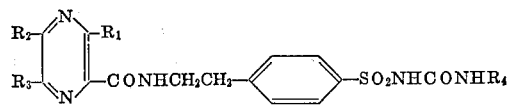

where $R_1$, $R_2$ and $R_3$ are independently hydrogen, halogen, alkyl of 1 to 4 carbon atoms, alkoxy, hydroxy, amino, substituted amino, phenyl and substituted phenyl. $R_4$ represents either 1. A saturated or unsaturated azacycloalkyl radical of 3 to 8 carbon atoms, optionally substituted with alkyl or alkoxy groups of 1 to 4 carbon atoms.
2. A saturated or unsaturated azabicycloalkyl radical of 5 to 12 carbon atoms optionally substituted with alkyl or alkoxy groups of 1 to 4 carbon atoms, as for example:

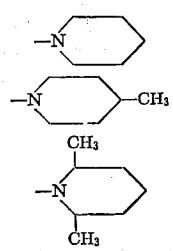

$R_4$ may also have the general formula:

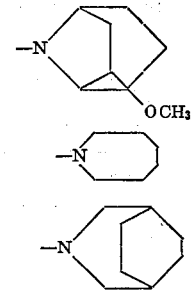

where R''' and R'''' are independently selected from the group consisting of hydrogen and alkyl groups of 1 to 4 carbon atoms and R'''' may also be a benzyl radical.

Acylaminoalkylbenzenesulfonyl ureas of the present invention may be prepared by reaction of compounds of the general formula:

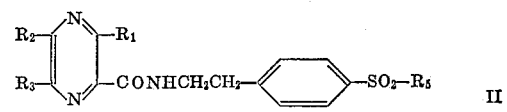

where $R_1$, $R_2$ and $R_3$ have the meanings given above and $R_5$ may be halogen, amino, isocyanate, urethane and urea, with ureas or esters of iminocarbamic acids containing the radical $R_4$ as described above or with hydrazines of the formula $H_2N$—$R_4$.

The pyrazine radical is introduced by acylation using, for example, the corresponding substituted acid halide, azide or via the mixed carboxylic-carbonic anhydride.

The compounds of formula II are prepared by methods taken from the literature.

With regard to the reaction conditions, the manner of carrying out the process of the present invention may, in general, vary within wide limits and can be adapted to each individual case. For example, the reactions may be carried out with the use of solvents, at room temperature or at an elevated temperature.

The resulting compound may be converted to a pharmaceutically acceptable salt by alkaline agents such as alkali metal hydroxides, alkali metal carbonates, alkali metal bicarbonates and alkaline earth metal bicarbonates or by physiologically tolerable acids.

Examples of pharmaceutically acceptable salts are those derived from mineral acids such as hydrochloric acid, phosphoric acid, sulfamic acid, and sulfuric acid; and organic acids such as acetic acid, citric acid, tartaric acid, lactic acid, ascorbic acid, methanesulfonic acid, ethanesulfonic acid, quinic acid, 3-hydroxy-2-naphthoic acid, naponic acid (1,5 - naphthalenedisulfonic acid), acetylsalicylic acid, salicyclic acid, mucic acid, muconic acid, and the like, giving the hydrochloride, phosphate, sulfamate, sulfate, acetate, citrate, tartrate, lactate, ascorbate, methanesulfonate ethanesulfonate, quinate, 3 - hydroxy-2-naphthoate, naponate, acetylsalicylate, salicylate, mucate, and muconate, respectively.

The compounds of the present invention are useful both in free form and in acid or basic addition salt form. Both forms are within the purview of the invention, and are considered to be one and the same invention. The acid or basic addition salts are simply a usually more convenient form for use.

The acid addition salts are prepared preferably by reacting the free base and acid in an organic solvent, e.g., ethanol, acetone, dimethylformamide, etc., in which case the salt separates directly or can be obtained by concentration of the solution.

Although pharmaceutically-acceptable salts are preferred all acid and basic addition salts are within the scope of our invention. All acid and basic addition salts are useful as sources of the free form even if the particular salt per se is not desired as the final product, as for example when the salt is formed for purposes of purification or identification, or when it is used as an intermediate in preparing a pharmaceutically-acceptable salt.

PHARMACOLOGICAL STUDIES

Pharmacological activity of the compounds of the present invention in the treatment of diabetes mellitus was investigated by screening method based on depression of blood sugar values in intact animals (William E. Dulin in Animal and Clinical Pharmacologic Techniques in Drug Evaluation—Year Book Med. Publ. 1964; August Loubatières in Evaluation of Drug Activities; Pharmacometrics—Acad. Press, N.Y. (1964). The method is derived from U.S.P. rabbit assay of insulin products and is a modification of method described by Hökfelt and Jönsson (J. Med. Pharm. Chem. 5, 231, 1962) in a study of large number of sulfonylureas. In this study New Zealand white rabits weighing 2.5 to 3.0 kg. were fasted for a period of 16 hours. For each compound tested three groups of six animals each were used. The compounds were administered per os suspended in 0.5 Methocel 400 in a volume of 0.5 ml./kg. Group I received compound at dose of 1.5 mg./kg. Group II received compounds at dose of 0.3 mg./kg., while Group III, the control group received only suspendent.

Blood samples were taken from the animals of all three groups before administration of the drug, at 3 hours after administration of N-(1-azacyclohept-1-yl)-N'-{4-[β-(5-methylpyrazine - 2 - carboxamido)ethyl]benzenesulfonyl} urea and again 6 hours thereafter. The samples were measured for blood sugar according to the method of o-toluidine (K. N. Dubowsky-Clin. Chem. 8, 215, 1967), and the results are given in Table I as percent lowering of glycemia as calculated against levels prior to administration of the compound.

TABLE I

Percent lowering of glycemia relative to pretreatment levels

| Group | Dose (mg./kg.) | Hours after administration | |
|---|---|---|---|
| | | 3 | 6 |
| I | 1,5 | 48% | 58% |
| II | 0,3 | 33% | 56% |
| III | 0 | 1% | 2% |

An additional investigation of the pharmacological activity of the compounds of the present invention in the treatment of diabetes mellitus was conducted using non-inbred male CFE SPF rats from the colony of Carlo Erba S.p.A., with the rats weighing between 130 and 160 g. and randomized. The rats were fasted for 10 hours before the investigation, and groups of six animals were used for each treatment for each dose. The compounds of the present invention, administered by a gavage, were suspended in methocel at a concentration of 0.5%, at dosage levels of 7.5, 1.5, and 0.3 mg./kg.

Blood samples for glucose assay were collected at time intervals of 30 and 180 minutes after the compounds were administered. The blood samples were obtained by decapitation, and blood glucose was assayed by the colorimetric method with o-toluidine (K. N. Dubowsky-Clin. Chem. 8, 215, 1967).

The percent lowering of blood glucose levels after treatment with N-(4-methyl-piperidino)-N'-{4-[β-(5-methyl-pyrazine - 2 - carboxamido) ethyl]benzenesulphonyl}urea as shown on Table II, with N-piperidino-N'-{4-[β-(5-methylpyrazine - 2 - carboxamido)ethyl]benzenesulphonyl}urea as shown on Table III, calculated against the blood glucose levels as measured prior to the administration of such compounds, is shown below.

TABLE II

| Dose (mg./kg.) | Minutes after administration | |
|---|---|---|
| | 30 | 180 |
| 7.5 | 53% | 54% |
| 1.5 | 52% | 46% |
| 0.3 | 37% | 22% |

TABLE III

| Dose (mg./kg.) | Minutes after administration | |
|---|---|---|
| | 30 | 180 |
| 7.5 | 36% | 46% |
| 1.5 | 22% | 38% |
| 0.3 | 12% | 6% |

A significant lowering of blood sugar levels will be readily observed from the above table. Moreover, this level was achieved using an effective dose of only a few milligrams, indicating a high degree of activity of the compounds of the invention.

The compounds of the present invention can be conveniently incorporated with pharmaceutical carriers or diluents such as, for instance, gelatin capsules; microcrystalline cellulose; lactose; natural gums; starches, such as corn starch and potato starch; cellulose derivatives, such as sodium carboxymethyl cellulose, ethyl cellulose, methyl cellulose, cellulose acetate phthalate; gelatin; talc; stearic acid; magnesium stearate; as well as other non-toxic compatible substances used in pharmaceutical formulations.

The following working examples illustrate but in no manner limit the scope of the present invention. Unless otherwise stated all parts and percentages are by weight.

EXAMPLE 1

Preparation of N - (1 - azacyclohept-1-yl)-N'-{4-[β-(5-methylpyrazine - 2 - carboxamido)ethyl]benzenesulfonyl}urea (or 4-{4-[β-(5 - methylpyrazine - 2 - carboxamido)ethyl]benzensulfonyl} - 1,1 - hexamethylene semicarbazide)

N - {4-[β-(5-methylpyrazine-2-carboxamido)ethyl]benzene-sulfonyl}methylurethane 7.6 g., melting point 192° C.) is dissolved in methanol (150 ml.) with stirring. To this solution 1-amino-1-azacycloheptane (2.6 g.) is added. The reaction mixture is agitated then the methanol removed by distillation at 35° C. under reduced pressure of 20 mm. Hg. The residue is then heated to 110–120° C. for 30 minutes; additional methanol is added and the product N-(1-azacyclohept-1-yl)-N'-{4-[β-(5-methylpyrazine-2-carboxamido)ethyl]benzenesulfonyl}urea is recrystallized to give 6.1 g. having a melting point of 196° C.

EXAMPLE 2

Preparation of N-(1-azacyclohept-1-yl)-N'-{4-[β-(5,6-dimethylpyrazine - 2 - carboxamido) ethyl]benzenesulfonyl}urea (or 4-{4-[β - (5,6-dimethylpyrazine - 2 - carboxamido)ethyl]benzenesulfonyl}-1,1 - hexamethylene semicarbazide)

N-{4-[β-(5,6-dimethylpyrazine - 2 - carboxamido)ethyl benzenesulfonyl}methylurethane (7.85 g., melting point 162°) is dissolved in methanol (150 ml.) with stirring. To this solution 1-amino-1-azacycloheptane (2.6 g.) is added. The reaction mixture is agitated then the methanol removed by distillation at 35° C. under reduced pressure of 20 mm. Hg. The residue is then heated to 110–120° C. for 30 minutes; additional methanol is added and the product N-(1-azacyclohept-1-yl)-N'-{4-[β-(5,6-dimethylpyrazine-2 - carboxamido)ethyl]benzensulfonyl} urea is recrystallized to give 5.8 g. having a melting point of 168–170°.

EXAMPLE 3

Preparation of N-(3-azabicyclo[3.2.2]non-3-yl)-N'-{4-[β-5-methylpyrazine - 2 - carboxamido) ethyl]benzenesulfonyl}urea(or 4-{4-[β-(5-methylpyrazine - 2 - carboxamido)ethyl]benzenesulfonyl}-1,1-(2,5-endoethylene)-hexamethylene semicarbazide)

N - {4-[β-(5-methylpyrazine-2-carboxamido)ethyl]benzenesulfonyl}methylurethane (7.6 g.), melting point 192° C., is dissolved in methanol (150 ml.) with stirring. To this solution 3-amino-3-azabicyclo[3.2.2]nonane (3.2 g.) is added. The reaction mixture is agitated then the methanol removed by distillation at 35° C. under reduced pressure of 20 mm. Hg. The residue is then heated to 110–120° C. for 30 minutes, additional methanol is added and the product N-(3-azabicyclo[3.2.2]non-3-yl)-N'-{4-[β-(5-methylpyrazine - 2 - carboxamido)ethyl]benzensulfonyl}urea is recrystallized to give 5.2 g. having a melting point of 197–199°.

EXAMPLE 4

Preparation of N-(3-azabicyclo[3.2.2]-non-3-yl)-N'-{4-[β-(5,6-dimethylpyrazine - 2 - carboxamido)ethyl]benzenesulfonyl}urea(or 4 - {4-[β-(5,6 - dimethylpyrazine-2-carboxamido)ethyl]benzenesulfonyl}-1,1-(2,5 - endoethylene)-hexamethylene semicarbazide)

N - {4-[β-(5,6-dimethylpyrazine-2-carboxamido)ethyl]benzenesulfonyl}methylurethane (7.85 g., melting point 162° C.) is dissolved in methanol (150 ml.) with stirring. To this solution 3-amino-3-azabicyclo[3.2.2]nonane (3.2 g.) is added. The reaction mixture is agitated then the methanol removed by distillation at 35° C. under reduced pressure of 20 mm. Hg. The residue is then heated to 110–120° C. for 30 minutes; additional methanol is added and the product N-(3-azabicyclo[3.2.2]-non-3-yl)-N' - {4-[β - (5,6-dimethylpyrazine-2-carboxamido)ethyl]benzenesulfonyl}urea is recrystallized to give 5.3 g. having a melting point of 162–163°.

EXAMPLE 5

Preparation of N-piperidino-N'-{4-[β-(5-methylpyrazine-2-carboxamido)ethyl]benzenesulfonyl}urea (or 4 - {4-[β-(5-methylpyrazine - 2 - carboxamido)ethyl]benzenesulfonyl}-1,1-pentamethylene semicarbazide)

N - {4 - [β - (5-methyl-pyrazine-2-carboxamido)ethyl]benzenesulphonyl}methyl-urethane (7.59 g.; m.p. 192° C.) in methanol (150 ml.) was reacted at room temperature (20° C.) with agitation with 1-amino-piperidine (2.2 g.). The methanol was removed by distillation at 35° C. under the reduced pressure of 20 mm. Hg., and the residue was heated at 120° C. for 30 minutes and then recrystallized from additional methanol (50 ml.) to produce the product N-piperidino-N'-{4[β-(5-methylpyrazine-2-carboxamido)ethyl]benzenesulphony}urea (4.6 g.; m.p. 194–196° C.).

EXAMPLE 6

Preparation of N - (4-methyl-piperidino) - N'-{4-[β-(5-methyl-pyrazine-2-carboxamido)ethyl]benzenesulfonyl} urea (or 4-{4-[β-(5-methylpyrazine-2 - carboxamido) ethyl]benzenesulfonyl}1,1 - (3 - methyl) - pentamethylene semicarbazide).

Using the process of Example 5, the methylurethane of Example 5 (3.8 g.) was reacted with 1-amino-4-methyl-piperidine (1.3 g.) to produce the product N-(4-methyl-piperidino) - N' - {4 - [β - (5-methyl-pyrazine-2-carboxamido) ethyl]benzenesulphonyl}urea (2.2 g.; m.p. 180–183° C.).

EXAMPLE 7

Preparation of N-(2,6-dimethyl-piperidino)-N'-{4-[β-(5-methyl-pyrazine-2-carboxamido)ethyl]benzenesulfonyl} urea(or 4 - {4-[β-(5 - methylpyrazine-2-carboxamido) ethyl]benzenesulfonyl} - 1,1 - (1,5 - dimethyl)-pentamethylene semicarbazide)

Using the method of Example 5, the methylurethane of Example 5 (7.59 g.) was reacted with 1-amino-2,6-dimethyl-piperidine (2.8 g.) to produce the product N-(2,6-dimethyl - piperidino) - N' - {4-[β-(5-methyl-pyrazine-2-carboxamido)ethyl]benzenesulphonyl}urea (5.0 g.; m.p. 200–202° C.).

What is claimed is:

1. A compound of the general formula:

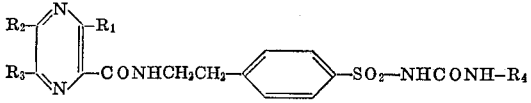

wherein $R_1$, $R_2$ and $R_3$ are independently selected from the group consisting of hydrogen, halogen, alkyl of 1 to 4 carbon atoms, alkoxy of 1 to 4 carbon atoms, hydroxy, the amino group:

wherein R and R' are independently selected from the group consisting of hydrogen and alkyl of 1 to 4 carbon atoms, and the phenyl group:

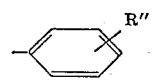

wherein R'' is selected from the group consisting of hydrogen, halogen, alkyl of 1 to 4 carbon atoms, alkoxy of 1 to 4 carbon atoms $R_4$ is selected from the group consisting of:
 (a) a saturated or unsaturated azacycloalkyl radical of 5–8 carbon atoms, which may be substituted with a member selected from the group consisting of alkyl and alkoxy groups of 1–4 carbon atoms, and
 (b) a saturated or unsaturated azabicycloalkyl radical of 5–12 carbon atoms, which may be substituted with a member selected from the group consisting of alkyl and alkoxy groups of 1–4 carbon atoms,
and the pharmaceutically acceptable salts thereof.

2. The compound as claimed in claim 1 wherein $R_1$ is hydrogen, $R_2$ and $R_3$ are lower alkyl groups of 1 to 4 carbon atoms, and $R_4$ is selected from the group consisting of a saturated azacycloalkyl radical of 5 to 8 carbon atoms or azabicycloalkyl radical of 5 to 12 carbon atoms and a saturated azacycloalkyl radical of 5 to 8 carbon atoms or azabicycloalkyl radical of 5 to 12 carbon atoms substituted with an alkyl group of 1 to 4 carbon atoms.

3. The compound as claimed in claim 2 wherein $R_2$ and $R_3$ are methyl and $R_4$ is piperidino.

4. The compound as claimed in claim 2 wherein $R_2$ and $R_3$ are methyl and $R_4$ is 4-methyl-piperidino.

5. The compound as claimed in claim 2 wherein $R_2$ and $R_3$ are methyl and $R_4$ is 1-azacyclohept-1-yl.

6. The compound as claimed in claim 2 wherein $R_2$ and $R_3$ are methyl and $R_4$ is 3-azabicyclo[3.2.2.]non-3-yl.

7. The compound N - (1 - azacyclohept-1-yl)-N'-{4-[β - (5 - methylpyrazine-2-carboxamido)ethyl]benzenesulfonyl}urea as claimed in claim 1.

8. The compound N - (1 - azacyclohept-1-yl)-N'-{4-[β - (5,6 - dimethylpyrazine - 2-carboxamido)ethyl]benzenesulfonyl}urea as claimed in claim 1.

9. The compound N - (3 - azabicyclo[3.2.]non-3-yl)-N' - {4 - [β - (5-methylpyrazine-2-carboxamido)ethyl]benzenesulfonyl}urea as claimed in claim 1.

10. The compound N - (3 - azabicyclo[3.2.2]non-3-yl)-N' - {4 - [β-(5,6-dimethylpyrazine-2-carboxamido)ethyl]benzenesulfonyl}urea as claimed in claim 1.

11. The compound N - piperidino - N'-{4-[β-(5-methyl-pyrazine - 2 - carboxamido)ethyl]benzenesulfonyl}urea as claimed in claim 1.

12. The compound N - (4 - methylpiperidino)-N'-{4-[β - (5 - methyl-pyrazine-2-carboxamido)ethyl]benzenesulfonyl}urea as claimed in claim 1.

13. The compound N - (2,6 - dimethyl-piperidino)-N'-{4 - [β - (5 - methyl-pyrazine-2-carboxamido)ethyl]benzenesulfonyl}urea as claimed in claim 1.

14. The process for the preparation of

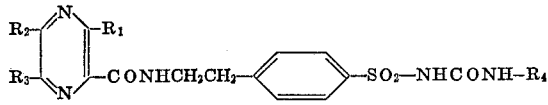

wherein

R₁, R₂ and R₃ are independently selected from the group consisting of hydrogen, halogen, alkyl of 1 to 4 carbon atoms, alkoxy of 1 to 4 carbon atoms, hydroxy, the amino group:

wherein R and R' are independently selected from the group consisting of hydrogen and alkyl of 1 to 4 carbon atoms, and the phenyl group:

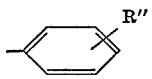

wherein R'' is selected from the group consisting of hydrogen, halogen, alkyl of 1 to 4 carbon atoms, alkoxy of 1 to 4 carbon atoms, R₄ is selected from the group consisting of:
(a) a saturated or unsaturated azacycloalkyl radical of 3 to 8 carbon atoms,
(b) a saturated or unsaturated azacycloalkyl radical of 3 to 8 carbon atoms substituted with alkyl or alkoxy groups of 1 to 4 carbon atoms,
(c) a saturated or unsaturated azabicycloalkyl radical of 5 to 12 carbon atoms,
(d) a saturated or unsaturated azabicycloalkyl radical of 5 to 12 carbon atoms substituted with alkyl or alkoxy groups of 1 to 4 carbon atoms,
(e) the general formula:

wherein R''' and R'''' are independently selected from the group consisting of R' and benzyl, and the pharmaceutically acceptable salts thereof by reacting a compound of the general formula:

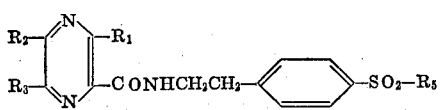

wherein

R₁, R₂ and R₃ have the meanings given above and R₅ is a urethane group, with a hydrazine of the general formula:

wherein R₄ has the meaning given above, at a temperature of about 20 to about 180° C. in an inert solvent.

15. The process as claimed in claim 14, wherein R₁ is hydrogen, R₂ and R₃ are lower alkyl groups of 1 to 4 carbon atoms, and R₄ is selected from the group consisting of a saturated azacycloalkyl radical of 3 to 8 carbon atoms or azabicycloalkyl radical of 5 to 12 carbon atoms and a saturated azacycloalkyl radical of 3 to 8 carbon atoms or azabicycloalkyl radical of 5 to 12 carbon atoms substituted with an alkyl group of 1 to 4 carbon atoms, and R₅ is urethane.

16. The process as claimed in claim 14 for the preparation of N - (1 - azacyclohept-1-yl)-N'-{4-[β-(5-methylpyrazine - 2 - carboxamido)ethyl]benzenesulfonyl}urea by reacting N - {4 - [β - (5-methylpyrazine-2-carboxamido)ethyl]benzenesulfonyl}methylurethane with 1 - amino - 1-azacycloheptane at from about 20 to 180° C.

17. The process as claimed in claim 14 for the preparation of N - (1 - azacyclohept-1-yl)-N'-{4-[β-(5,6-dimethylpyrazine - 2 - carboxamido)ethyl]benzenesulfonyl}urea by reacting N - {4 - [β-(5,6-dimethylpyrazine-2-carboxamido)ethyl]benzenesulfonyl}methylurethane with 1-amino-1-azacycloheptane at from about 20 to 180° C.

18. The process as claimed in claim 14 for the preparation of N - (3 - azabicyclo[3.2.2]non-3-yl)-N'-{4-[β-(5-methylpyrazine - 2 - carboxamido)ethyl]benzenesulfonyl}urea by reacting N - {4 - [β-(5-methylpyrazine-2-carboxamido)ethyl]benzenesulfonyl}methylurethane with 3-amino - 3 - azabicyclo[3.2.2]nonane at from about 20 to 180° C.

19. The process as claimed in claim 14 for the preparation of N - (3 - azabicyclo[3.2.2]non-3-yl)-N'-{4-[β-(5, 6 - dimethylpyrazine - 2 - carboxamido)ethyl]benzenesulfonyl}urea by reacting N-{4-[β-(5,6-dimethylpyrazine-2 - carboxamido)ethyl]benzenesulfonyl}methylurethane with 3-amino-3-azabicyclo[3.2.2]nonane at from about 20 to 180° C.

20. The process as claimed in claim 14 for the preparation of N-piperidino-N'-{4-[β-(5-methylpyrazine-2-carboxamido)ethyl]benzenesulfonyl}urea by reacting N-{4-[β-5-methylpyrazine - 2-carboxamide)ethyl]benzenesulfonyl}-methylurethane with 1-amino-piperidine at from about 20 to 180° C.

21. The process as claimed in claim 14 for the preparation of N - (4 - methyl - piperidino)-N'-{4-[β-(5-methylpyrazine - 2 - carboxamido)ethyl]benzenesulfonyl}urea by reacting N - {4 - [β-(5-methylpyrazine-2-carboxamido)ethyl]benzenesulfonyl}methylurethane with 1 - amino - 4-methyl piperidine at from about 20 to 180° C.

22. The process as claimed in claim 14 for the preparation of N - (2,6 - dimethyl-piperidino)-N'-{4-[β-(5-methylpyrazine - 2 - carboxamido)ethyl]benzenesulfonyl}urea by reacting N - {4 - [β-(5-methylpyrazine-2-carboxamido)ethyl]benzenesulfonyl}methylurethane with 1-amino-2,6-dimethyl-piperidine at from about 20 to 180° C.

23. Compound as claimed in claim 1 wherein R₄ is piperidino.

24. The compound as claimed in claim 1 wherein R₄ is 4-methyl-piperidino.

25. The compound as claimed in claim 1 wherein R₄ is 1-azacyclohept-1-yl.

26. The compound as claimed in claim 2 wherein R₄ is 3-azabicyclo[3.2.2]non-3-yl.

References Cited
UNITED STATES PATENTS

| | | | |
|---|---|---|---|
| 3,573,305 | 3/1971 | Cragoe et al. | 260—250 R |
| 3,669,966 | 6/1972 | Ambrogi et al. | 260—250 R |

NICHOLAS S. RIZZO, Primary Examiner

U.S. Cl. X.R.

424—250